(12) United States Patent
Yakman et al.

(10) Patent No.: US 9,124,682 B2
(45) Date of Patent: *Sep. 1, 2015

(54) AUDITING AND OPTIMIZING COMMUNICATION PATH ROUTES

(71) Applicant: WaveCode, Inc., Richardson, TX (US)

(72) Inventors: Brian Todd Yakman, Allen, TX (US); Scott Leonard Heber, Allen, TX (US); Eduardo Alberto Outeda, Frisco, TX (US)

(73) Assignee: WAVECODE, INC., Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/274,866

(22) Filed: May 12, 2014

(65) Prior Publication Data

US 2014/0247935 A1 Sep. 4, 2014

Related U.S. Application Data

(63) Continuation of application No. 13/400,203, filed on Feb. 20, 2012, now Pat. No. 8,724,792.

(51) Int. Cl.
*H04M 7/00* (2006.01)
*H04M 7/12* (2006.01)
*H04L 12/701* (2013.01)

(52) U.S. Cl.
CPC .............. *H04M 7/128* (2013.01); *H04L 45/00* (2013.01)

(58) Field of Classification Search
CPC ............ H04M 15/80; H04M 15/8044; H04M 2215/0152; H04M 2215/42; H04M 2215/745; H04M 2215/7886; H04M 7/128
USPC .................. 379/219, 220.01, 221.01, 221.02, 379/221.14, 222, 224
See application file for complete search history.

(56) References Cited

U.S. PATENT DOCUMENTS

| 5,862,203 | A   | * | 1/1999  | Wulkan et al. | 379/114.02 |
|-----------|-----|---|---------|---------------|------------|
| 6,694,313 | B1  | * | 2/2004  | Roemer        | 1/1        |
| 6,850,611 | B1  | * | 2/2005  | Chalk         | 379/221.01 |
| 2006/0291643 | A1 | * | 12/2006 | Pfaff et al. | 379/221.12 |
| 2007/0128899 | A1 | * | 6/2007  | Mayer        | 439/152    |
| 2008/0317237 | A1 | * | 12/2008 | Lozano et al. | 379/220.01 |
| 2009/0080630 | A1 | * | 3/2009  | Davis et al. | 379/201.02 |
| 2011/0044445 | A1 | * | 2/2011  | Gore         | 379/220.01 |
| 2012/0155628 | A1 | * | 6/2012  | Booth et al. | 379/221.05 |

* cited by examiner

*Primary Examiner* — Khai N Nguyen

(57) ABSTRACT

Example embodiments of the present invention may include a method and apparatus configured determine an optimal routing path to route a call through a network. One example method may include retrieving and parsing a routing table and storing the parsed routing information in a routing database. The method may also include determining a plurality of routes that could be used to route the call through the network by applying at least one cost metric to the plurality of determined routes. The method may also include determining an order of the plurality of routes used to route the call, and create a route used to route the call based on the determined order of the plurality of routes.

20 Claims, 10 Drawing Sheets

200

| NPA | NXX | DATA | MBA | End Office | Destination | |
|---|---|---|---|---|---|---|
| 214 | 502 | 552 | 7 | FRBRTXBLGT2 | DLLSTXRI01T | Rule Set 1 |
| 214 | 503 | 552 | 7 | DLLSTXDIDS0 | DLLSTXRI01T | |
| 214 | 504 | 552 | 7 | MCKNTXLIDS0 | DLLSTXRI01T | |
| 214 | 505 | 552 | 7 | CRTNTX35GT2 | DLLSTXRI01T | Rule Set 2 |
| 214 | 507 | 552 | 7 | CRTNTX35GT2 | DLLSTXRI01T | |
| 214 | 514 | 552 | 7 | DLLCTX1KCM0 | DLLSTXRI01T | |

| Route | Rule Set | Level |
|---|---|---|
| ROUTE #2 | 1 | Tandem |
| ROUTE #1 | 2 | End Office |

| Conditions | 1 | 2 | 3 | 4 | 5 | 6 | 7 | 8 | 9 | 10 |
|---|---|---|---|---|---|---|---|---|---|---|
| | NT | NT | NT | NT | NT | NT | NT | NT | NT | NT |
| According to dialed LRN, is Route Tandem Route? | Yes | Yes | Yes | No | No | No | Yes | Yes | No | No |
| Local Carrier - NT - Using OCN & State of CLLI of LSDOT of tandem of the NPANXX being analyzed (Rate Found?) | | | | | | | | | | |
| Local Carrier – Using OCN & State of Route CLLI (Rate Found?) | Yes | Yes | No | Yes | No | No | Yes | Yes | No | No |
| OCN – Are the OCN of NPANXX and OCN of Route equal? | Yes | No | | | | | | | | |
| Local Carrier – Using OCN & State of NPANXX CLLI (Rate Found?) | | | | | Yes | No | Yes | No | Yes | No |
| Local Carrier – Does NPANXX belong to same carrier as Route? | | | | | | | | | | |
| Rates to Apply | | | | | | | | | | |
| ROUTE_TERMINATE_RATE | X | X | | | | | | | | |
| ROUTE_TRANSIT_RATE | | X | | X | | | | | | |
| NPANXX_TERMINATE_RATE | | | | | X | | X | X | | |
| LSDOT_CLLI_NEUTRAL_RATE | | | X | | | X | X | | X | |
| Default Rates | | | | | | | | | | |
| DEFAULT_TERMINATE_RATE | | | | X | | | | | | |
| DEFAULT_TRANSIT_RATE | | | | | | | | | | |
| DEFAULT_NEUTRAL_RATE | | | | | | | | | X | X |

FIG. 2G

AUDITING AND OPTIMIZING COMMUNICATION PATH ROUTES

CROSS-REFERENCE TO RELATED APPLICATIONS

This application is a continuation of U.S. application Ser. No. 13/400,203, filed Feb. 20, 2012, titled AUDITING AND OPTIMIZING COMMUNICATION PATH ROUTES, now issued U.S. Pat. No. 8,724,792, issued on May 13, 2014, which is hereby incorporated in full by reference herein.

TECHNICAL FIELD OF THE INVENTION

This invention relates to a method and apparatus of auditing routing information of communication path routes to determine an optimal path used to route a call.

BACKGROUND OF THE INVENTION

Voice and data communication routing may experience high levels of data traffic. There are various levels of switching components operating in an integrated communication network including local telephony, long distance telephony, mobile networks, etc. Each switch and network element operating within the data communication network routes voice and/or data traffic based on a source and destination. Route data used to route and switch the data traffic may be stored, updated and retrieved from multiple different network devices operating within the communication network. The routing data may experience frequent updates from one or more of the communication switches during a routing procedure. It may be necessary to retrieve and weigh each of the routing possibilities based on more than one routing metric or criteria.

SUMMARY OF THE INVENTION

An example embodiment may provide a method of determining an optimal routing path. The method may include retrieving at least one routing table, parsing the at least one routing table and storing the parsed routing information in a routing database, determining a plurality of routes that could be used to route the call through the network by applying at least one cost metric to the plurality of determined routes. The method may also include determining an order of the plurality of routes used to route the call, and creating a route used to route the call based on the plurality of routes and the determined order of the plurality of routes.

Another example embodiment of the present invention may include an apparatus configured to determine an optimal routing path. The apparatus may include a receiver configured to retrieve at least one routing table from a memory. The apparatus may also include a processor configured to parse the at least one routing table and store the parsed routing information in a routing database, determine a plurality of routes that could be used to route the call through the network by applying at least one cost metric to the plurality of determined routes, determine an order of the plurality of routes used to route the call, and create a route used to route the call based on the plurality of routes and the determined order of the plurality of routes.

BRIEF DESCRIPTION OF THE DRAWINGS

FIG. 2A illustrates an example table illustrating rule sets and corresponding routing records according to example embodiments of the present invention.

FIG. 2B illustrates another example table illustrating rule sets and hierarchy routing records according to example embodiments of the present invention.

FIG. 2G illustrates an example route table illustrating the route settings and applied rates according to example embodiments of the present invention.

DETAILED DESCRIPTION OF THE INVENTION

Figure 1:
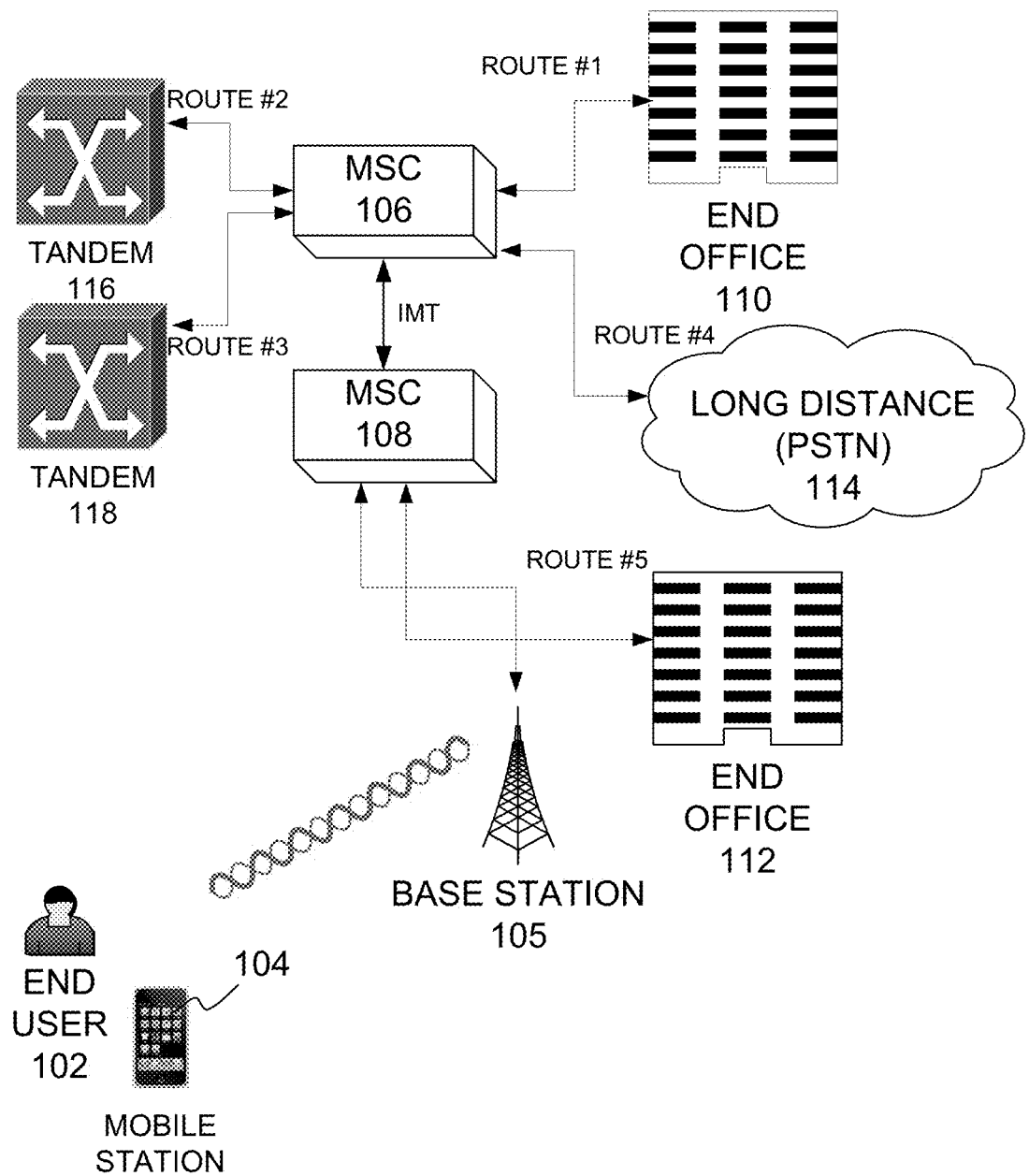
FIG. 1 illustrates an example network configuration according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

A call routing and/pr path determination procedure may be used to identify optimum communication routes and optimize existing or known communication routes. Path finding and discovery may be performed by identifying new and updated route information. There may be four sub-procedures used to perform the path finding audit procedure according to example embodiments. The sub-procedures may include a download, pre-audit, rules sets & hierarchy identification, and the actual audit itself. The path determination procedure/application may be used to select an optimal route to transmit each call.

Each call (e.g., landline, VoIP, cellular, etc.) placed and/or received may have a corresponding numbering plan area (NPA) and corresponding local numbering range (NXX) range. The NPA/NXX ranges are numbers that are used by telephone switches to route calls in the public switched telephone network (PSTN). The NPA is often referred to as the area code, and is the first three digits of an individual telephone number. The NXX is the second group of three digits and are typically associated with an end office telephone switch. So the number '214-570' would be the first six digits of a ten digit telephone number. The 214 would be the NPA (area code) and the 570 would be the local NXX part of the range. The 214-570 range would start at 2145700000 and go to 2145709999. Each NPA-NXX range is comprised of ten thousand individual telephone numbers.

There are generally four sub-procedures used to perform the path finding audit procedure according to example embodiments. The download sub-procedure section of the path determination procedure may perform retrieving and/or gathering of data tables (e.g., routing tables, IP address information, etc.) from the various switches in the wireless provider's network. These switch tables are then parsed and placed into tables within the audit procedure application database. The tables are stored locally at network devices throughout the network. The parsing creates a new set of data customized for the target user's device and the corresponding MSC to route calls based on the parsed data. The network switches themselves have these tables stored in their databases throughout the network. When the tables are downloaded from the switches, they are provided to one centralized path determination database as a new set of data. When that table information is parsed it may then be customized for use within the path determination application. The data is used to emulate how the switch itself would route calls through its tables, and out to the final route. The stored data is located in a database and accessed when a pre-audit is performed.

FIG. 1 illustrates an example communication network according to example embodiments. Referring to FIG. 1, a communication network 100 may include an end user 102 operating a mobile station 104, which in turn, communicates to a base station 105. Voice and/or data communications may be initiated by any user of a communication device (e.g., telephone, mobile phone, smartphone, table computing device, laptop, personal computer, etc.). The base station 105 communicates with a mobile switching center (MSC) 108. Additional network elements may include additional MSCs 106, tandem switching centers 116 and 118, a long distance (PSTN) backbone 114, and end offices 110 and 112.

The communication signaling conducted over the network 100 may include voice telephony communication signaling for both landline and wireless communications. The various components include MSCs 106 and 108, end offices 110 and 112, and tandem switching centers 116 and 118, which are used to identify the various paths (Routes #1-#5) used to route a communication session (e.g., voice call, data call, packets, etc.) established between two or more endpoints (e.g., landline phones, smartphones, mobile computing devices, etc.).

Referring to FIG. 1, the two MSC's 106 and 108 are connected to each other by an inter-machine trunk (IMT). The IMT is an internal route used to connect a carrier's own switches. Each of the lines drawn between the MSC's and the other network elements represent routes that a call may be routed across the network (i.e., routes #1-5). According to one example, a routing case from MSC 106 might include the following route, RC 1: 1. Route 1, 2. Route 2, and 3. Route 4. If an NPA/NXX such as (214-570) was assigned to this routing case, the path determination application would produce the current switch data for this NPA/NXX example to include: NPA NXX Route—Routing Case 214 570 Route 1-RC 1.

The pre-audit sub-procedure for the path determination application emulates each switching technology in an effort to determine how a call is routed through a switch. Other methods for determining a current routing path could be used, such as collecting the routing information from one table in the switch where all ranges have their routing case and or route information displayed, and no switch routing emulation is required. Additionally, routing information could just be collected from a database that contained all current routing information for each NPA/NXX range. The pre-audit sub-procedure will provide both a route and a routing case for each NPA/NXX. A routing case is a list of routes that an NPA/NXX can be routed. Another name for a routing case is a trunk group list. The routing case not only provides the list of routes that an NPA/NXX can be routed, it also indicates the order that must be used during the routing procedure. For instance, the routing case may include a set of instructions that the NPA/NXX range must follow in order to route the call to the route that was approved by the administrator. In other words, this provides the administrator with a way to guide an NPA/NXX range for routing via a particular route. If a particular route is busy, the routing case provides other examples as the next best route for the NPA/NXX range to take. In other words, the first route in a routing case should be the first route taken. If that route is congested, then the NPA/NXX can take a second route, and so on, until the NPA/NXX has either been routed down a particular route or all of the possibilities have been exhausted.

The hierarchy, rule sets and price sub-procedure is another portion of the path determination application according to example embodiments. An audit is the process of comparing pre-audit results to the optimal route. The optimal route is defined as the route that matches a rule set, a hierarchy, and/or the lowest price calculation. According to one example, the rule set may be defined by the administrators. A rule set may include variables found in the local exchange routing guide (LERG), which is a datasheet that describes information for each of a 150 thousand NPA/NXX ranges.

The rule set information may include, but is not limited to: the end office switch that owns the NPA/NXX range, the company that owns the NPA/NXX range, the tandem that parents the end office, which allows companies to route to a parenting tandem instead of the end office itself, and other information that could be pertinent to how the range should be routed. The LERG provides information necessary for third party companies to route NPA/NXX ranges that they do not own. For example, a rule set could include the following: "If NPA=214 then send the NPA/NXX range down route LMN." However, in this example the NPA/NXX could match multiple rules sets.

A hierarchy may be used to represent different levels representing route cost. The top level represents the most expensive level, while the bottom would be the least expensive level. Examples of network hierarchy levels are illustrated in FIGS. 2D-2E. Each outgoing route in a switch is assigned to one of these levels in the path determination application. For example, a particular switch might have two routes including a long distance route, and a tandem route. If the switch did not have any routes assigned to the end office level, then that would not preclude that level from remaining in the hierarchy. However, the carrier would not be able to send any calls to the end office because they do not have any associated routes at that level.

Within the hierarchy, the default route may be set to long-distance. Therefore, if a particular NPA/NXX matches no rules sets then it would be set as the default route. A simple example of a hierarchy would be the following: 1) long-distance, 2) tandem, 3) end office. In this hierarchy example, a route assigned as long-distance is the least desirable level an NPA/NXX could take, while a route assigned as an end office is the most desirable based on measured costs.

Assume for a moment that two routes and two rule sets exist, with rule set one assigned to route ABC and rule set two assigned to route XYZ. Route ABC may have a rule set 1 and a tandem hierarchy level. Route XYZ may have a rule set 2 and an end office hierarchy level. Example assignments in the path determination application may have a rule set: 1. Get all NPA/NXX's from the LERG, where any tandem CLLI='DLLSTXRI01T', and 2. Get all NPA/NXX's from the LERG, where End Office CLLI='CRTNTX35GT2.'

FIG. 2A illustrates a LERG table that may be used to apply the rule sets. Referring to table 200, the LERG table 200 provides ranges 214-505, and 214-507, which belong to both rule set one and rule set two. The numbering plan area code (NPA) 202 represents the first three digits of a 10 digit NANP telephone number. The NPA, combined with the central office code (COC), is the destination code being reported. A NPA is commonly referred to as an area code. The number format is NXX (where N=2-9, X=0-9). The NXX 204 in the LERG may be referred to as a central office code (COC) or destination code. NXXs are the three digits following the NPA (area code) in the numbering scheme used by countries participating in the North American numbering plan (NANP).

Other parameters from table 200 include a local access and transport area (LATA) 206, which defines the area within which the local service providers are permitted to carry traffic. A LATA is defined by a three-position number, each of which has an associated LATA NAME, e.g., 120 for the state of Maine. Some LATA descriptions indicate a five position field for the LATA code. The last two digits are for the LATA sub-zone (in Florida only) which represent equal access exchange areas (EAEAs). The LATA sub-zone is blank in all other cases. For switch LATA, in instances where the switch (or switches in a common building) serves NXXs in two LATAs, the LATA entry might be different from the geographical LATA of the switch. In such cases the LATA identifies the LATA to which interexchange carriers deliver traffic for access to the NXXs assigned to the particular switch LATA.

Some of the more common LERG fields used are NPA, NXX, operating company number (OCN), administrative operating company number (AOCN), local access and transport area (LATA), major trading area (MTA), End Office, Local Tandem, B Tandem, C Tandem, D-Tandem, Intra-LATA Tandem, switch homing arrangement (SHA), special service code (SSC), among other LERG fields.

A switch may be defined in one LATA and its corresponding tandem(s) may be located in another LATA. For example, a NXX may be associated with a rate center that is in one LATA, while being served by a switch in another LATA for call routing purposes. Although the LATA values associated with a switch, tandem, and/or rate center, relative to an NPA/NXX, are usually all the same values, certain exceptions may exist depending on the network configuration. According to one example, LATA '99999' may be found for some records. These are generally cases of uncommon NXXs which are not associated with a single LATA. Uncommon NXXs may be assigned to "multiple" carriers (e.g., 411), and certain NPAs may overlay more than one LATA. The uncommon NXXs may appear with LATA '99999.' The geographical "boundaries" of LATAs are generally within, but do occasionally cross, state boundaries. LATAs generally only pertain to FCC managed areas in the NANPA. However, for purposes of data consistency, LATAs are associated with other NANP countries (e.g., 888 is the entire country of Canada) and with U.S. territories that have joined the NANP since 1984.

The major trading area (MTA) 208 is a coded value used by the U.S. Federal government for determining service areas for some wireless service providers. Data in the LERG maps a rate center to the MTA 208. Due to noncontiguous boundaries between MTAs and rate centers there may be two MTAs associated with a rate center. The end office 210 is a switching system that establishes line-to-line, line-to-trunk, and/or trunk-to-line connections, and provides a dial tone to customers. Lineless hosts are not considered end offices. A D-tandem switch 212 connects one switch to another and serves as a concentration and distribution function to minimize direct end office interconnection. The D-tandem is a switch or connection between an originating switch and the final switch call destination. A tandem switch does not allow origination or termination of telephone calls. Tandems serve a designated geographic area including specific rate centers.

In some cases, homing arrangements are provided between a switching entity and certain offices. These are not tandems but the homing relationships may be provided in the same manner (e.g. files, etc.) as actual switch/tandem homing. Examples of homing arrangements may include signaling transfer points, end office hosts, 800 SSP offices, intermediate offices, actual switch/POI relationships, etc.

NPA/NXX ranges may belong to more than one rule set. In such a case, the path determination application uses the hierarchy to resolve the problem. The hierarchy imposes a choice on NPA/NXX's that belong to more than one rule set, by automatically choosing the route that has the lowest matching level from the hierarchy as the optimal route to send those NPA/NXX ranges.

FIG. 2B illustrates an example hierarchy routing table 240 according to example embodiments. Referring to FIG. 2B, in this example, assume that a route may be taken from MSC 106 to the end office 110 (Route #1) or from the MSC 106 to the tandem 116 (Route #2). The selected route 242 would be Route #2, because two rule sets 242 exist which have criteria that matches both ranges. For example, rule set 1: Get all NPA/NXX's from the LERG, where any tandem CLLI='DLLSTXRI01T', and rule set 2: Get all NPA/NXX's from the LERG, where End Office CLLI='CRTNTX35GT2.' The decision to determine the most optimal route is placed in the hands of the hierarchy level 246. Now that the hierarchy is used to determine a routing decision, it uses the level of the rule sets to select a route. The rule set at the lowest level on the hierarchy is rule set '2' because it is assigned to the "End Office" level. Since rule set '1' is assigned to the "Tandem" level, it is at a higher level on the hierarchy and as a result is not considered an optimal routing selection.

In the event that there are multiple routes at the same level within the hierarchy, for example if there are 2 tandem routes that have rules sets that allow one or more NPA/NXX ranges, then the path finding application may use 'price' to determine the optimal route for those ranges. The price determination is performed on a NPA/NXX basis, but the pricing is typically agreed to on an OCN, STATE basis. An example price analysis may include referencing a carrier price list, which may include NPA 214, NXX 502, LATA 552, OCN 123, STATE Texas and a corresponding price 0.00321 cents. In this particular case, the NPA/NXX range 214-502 may be parented by a local tandem and a D-tandem, as described by the LERG. For example, the LERG may have a record of NPA 214, NXX 502, LATA 552, MTA 7, End Office FRBRTXBLGT2, Local Tandem DLLSTXTA05T, and D-Tandem DLLSTXRI01T. This record is similar to the first record in FIG. 2A, however in this case a local tandem exists in addition to the D-tandem.

Assuming that an MSC is defined in the path determination application to treat all tandem levels equal, then both tandem connections (local tandem and D-tandem) would be treated by the path determination application to be at the same level in the hierarchy. The wireless carrier or in this case, the path determination application now has to make a decision about the best route to take. The path determination application may reference the pricelists in order to make the routing decision.

When checking the price list, the path determination application must determine if either of the tandems belongs to the same carrier as the NPA/NXX. If, for example, it is determined that the local tandem DLLSTXRI01T belongs to the same carrier as the NPA/NXX, then there will be no transiting fee, termination fee, or drop charge associated with terminating NPA/NXX on route to the local tandem DLLSTXRI01T. If D-tandem DLLSTXTA05T belongs to a different carrier, then there will most likely be a fee to terminate the call to the D-tandem and the route with the lowest price would be to the local tandem. The path finding application would choose to send the range to the local tandem. Routing the call may include routing to a tandem, end office, long distance carrier, an IMT, a SIP route, a mobile switching center, etc.

According to example embodiments, for the audit sub-procedure, the results of the pre-audit and the decision analysis (the rule sets, hierarchy, and price) are compared to make a final routing decision. The audit produces a result referred to as "the difference." If there is no difference between the pre-audit sub-procedure, and the decision analysis, then the NPA/NXX will remain with the route and routing case that is currently assigned. However, if a difference does exist, then the ultimate decision will be to select to change the route and or routing case of the NPA/NXX to that of the "decision analysis", rather than staying with the current route and routing case. The audit is where the cost is involved to make sure the pre-audit is correct. The "decision analysis" is actually part of the audit process. The decision analysis helps determine the proper route, while the audit determines if the current routing is equal to the optimal routing by calculating "the difference." If the result of the calculation determines that the current routing is not equal to the optimal routing, then the audit sub-procedure determines that the proper route is the route from the "decision analysis."

Figure 2C:
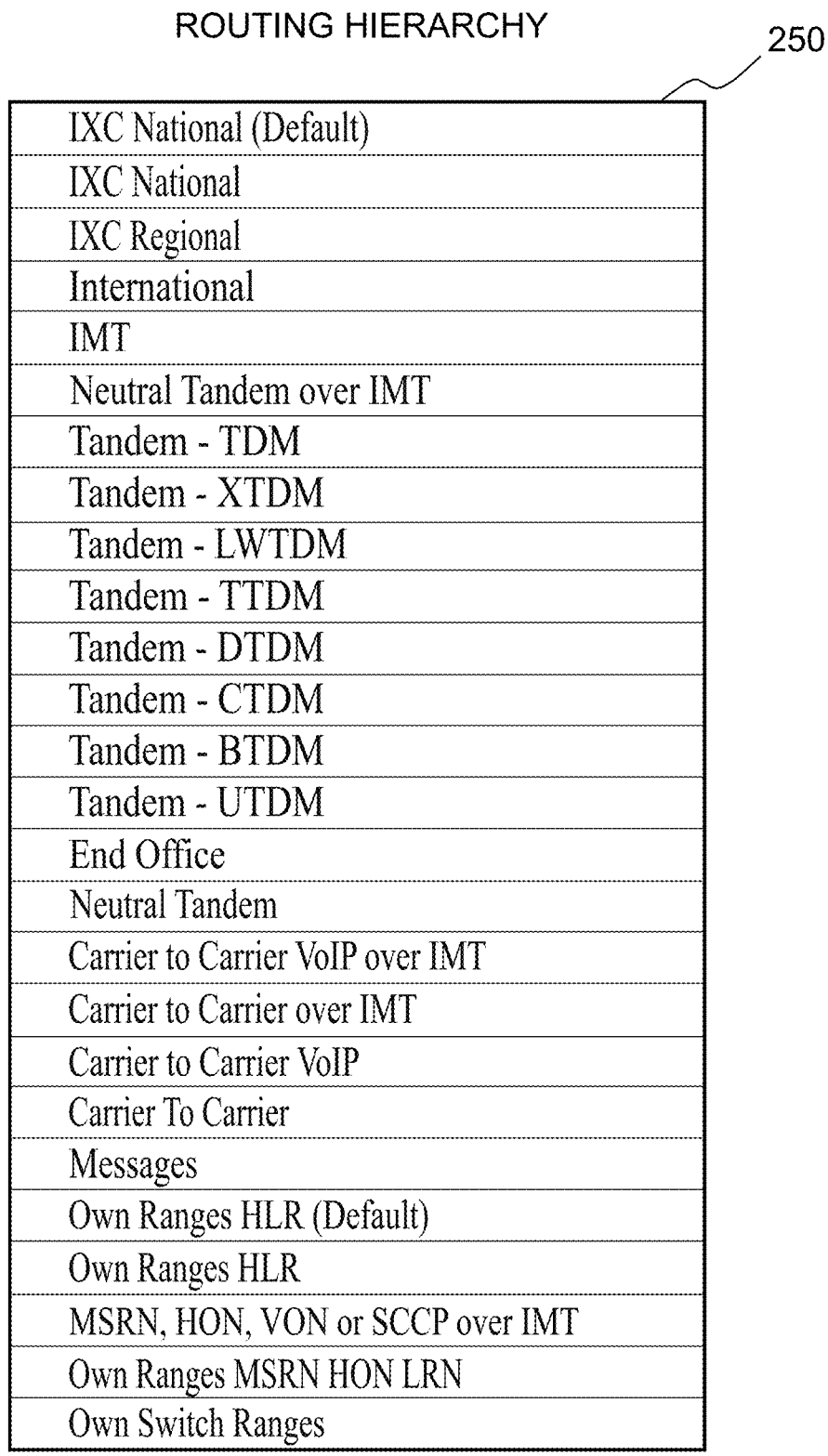
FIG. 2C illustrates an example hierarchy according to example embodiments of the present invention.
Figure 2D:
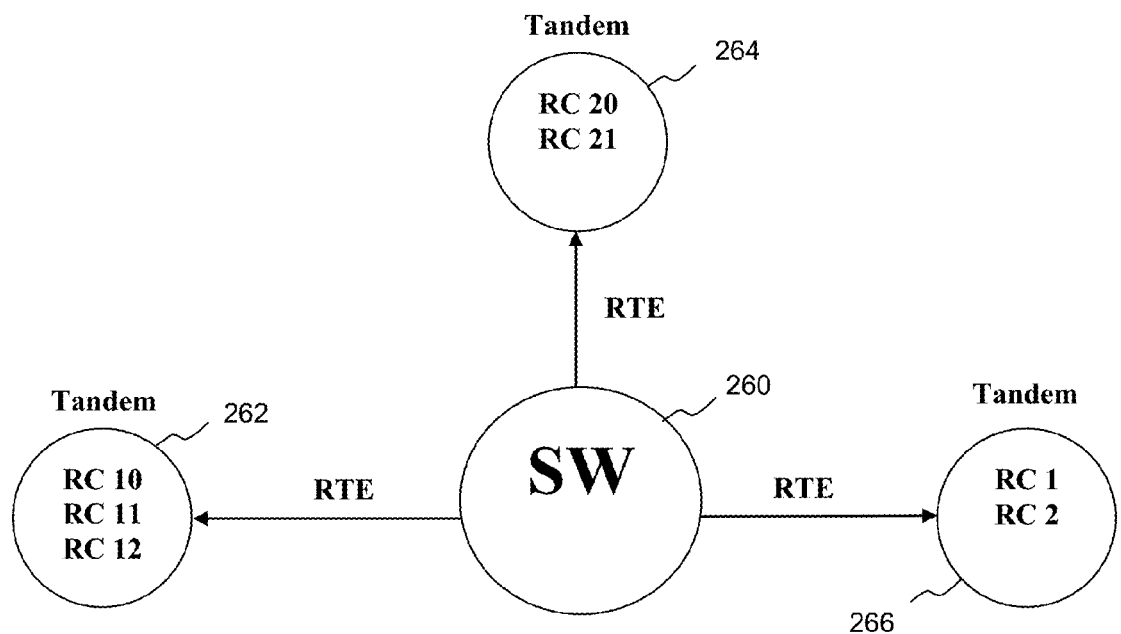
FIG. 2D illustrates a switch route logic diagram according to example embodiments of the present invention.
Figure 2E:
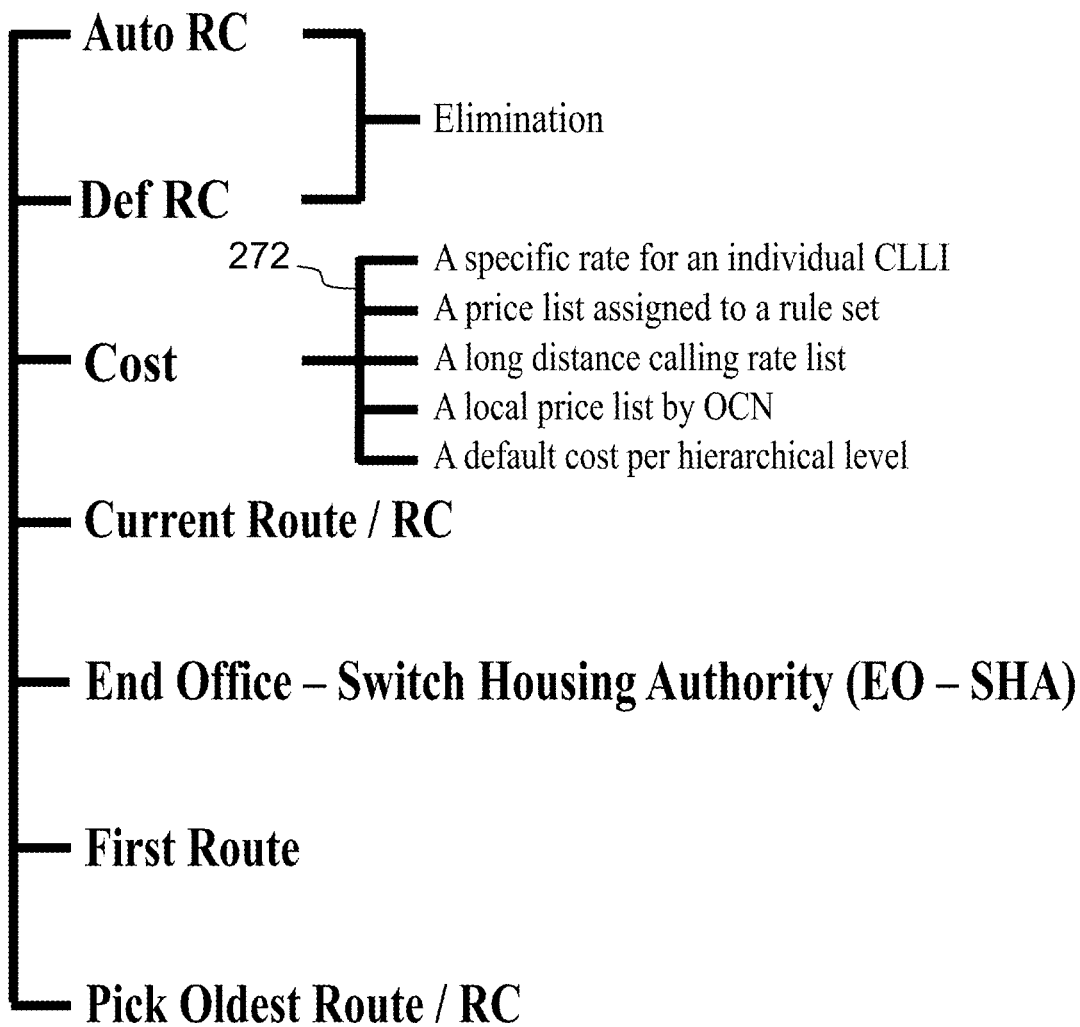
FIG. 2E illustrates a hierarchy within a particular level according to example embodiments of the present invention.

When a NPA/NXX range is being evaluated by the route determiner to determine which route/routing case would be the most optimal to send the range, the route determiner first relies on the hierarchy 250 of FIG. 2C. It is important to note that the route determiner always uses the primary route of the routing case. So the route/routing case may be the primary route. In the event that there are multiple routes at the same level within the hierarchy, for example if there are 3 tandem routes (262, 264 and 266), such as in FIG. 2D, each with multiple routing cases that have corresponding rules sets that allow the NPA/NXX range for that particular path, then the route determiner may use 'cost' to determine the optimal route for those ranges.

The route determiner application proceeds by eliminating various route/routing case options. Once the route determiner has eliminated all route/routing cases that can be eliminated due to various reasons (e.g., blacklisted routes, overused routes, etc.), if there is still more than one route/routing case that can accept the NPA/NXX range, then the route determiner can perform a cost calculation as illustrated in FIG. 2E.

Referring to FIG. 2E, the hierarchy within a level diagram 270 includes a specific set of cost data or cost metrics 272, including but not limited to "CLLI rate", "price list", "calling rate", "local price list", "default cost" per hierarchical level. A call route elimination procedure 282 is illustrated in the call route selection procedure 280 of FIG. 2F, the elimination procedure 282 proceeds by first checking which rule sets are assigned to which routes setup with either an "auto routing case" or "default routing case." If for example, 'RTE 3' was the primary route on three different routing cases (RC 10, RC 11 and RC 12), and 'RTE 3' was setup to use the feature "auto routing case", then the auto routing case feature would begin to compare all three routing cases to determine the best one based on the alternate routes of each of the three routing cases. If "auto routing case" determined that RC 10 was the best option, then RC 11 and RC 12 could be immediately removed as options. This is illustrated in the "elimination" column 282 of FIG. 2F, where RC 10 is circled.

Figure 2F:
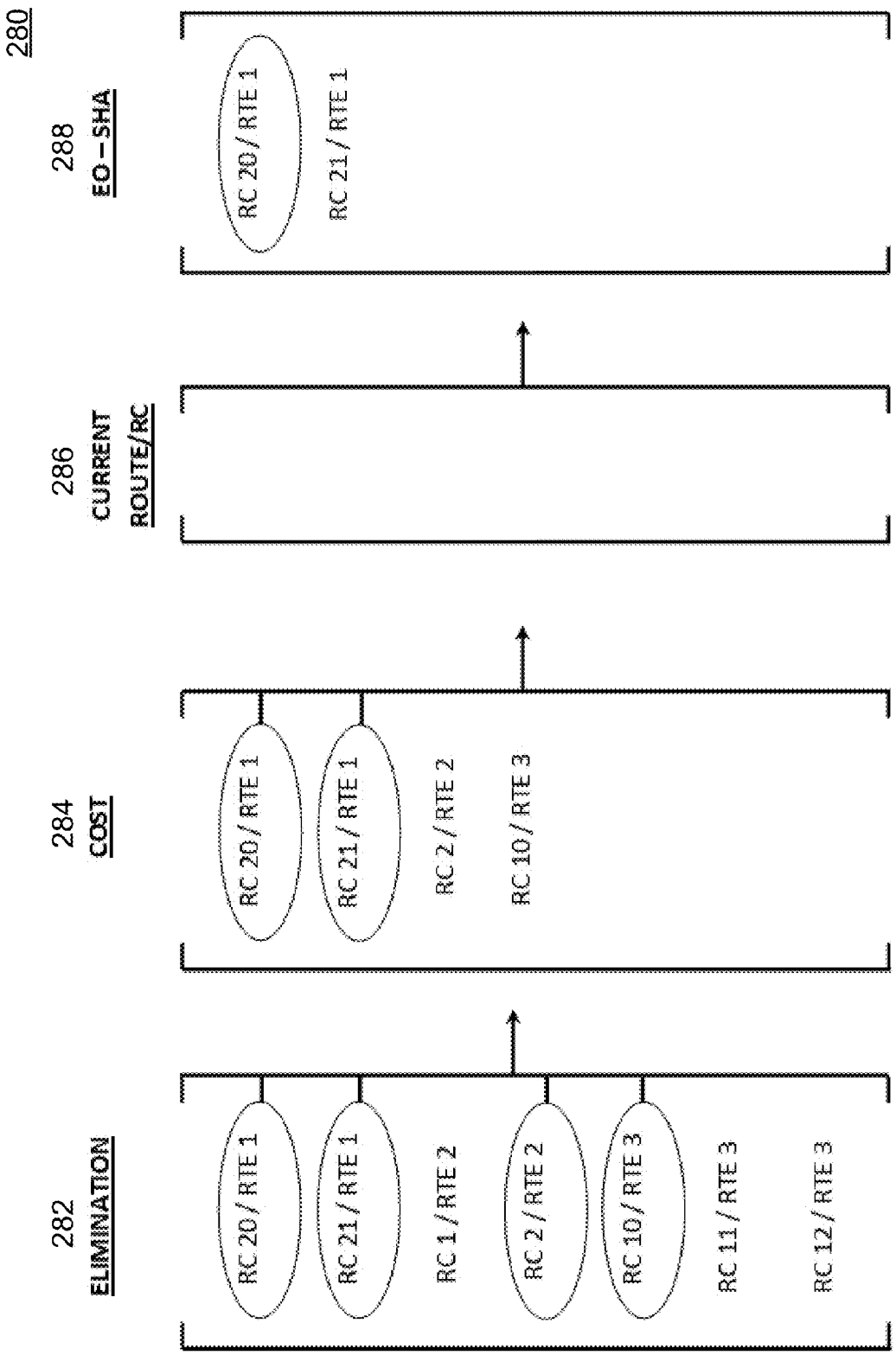
FIG. 2F illustrates an example route diagram illustrating the route determination process according to example embodiments of the present invention.

Moving on to the "Cost" column 284 of FIG. 2F, the "default routing case" feature works similar to the "auto routing case" feature, in that it is also used as an elimination mechanism. The default routing case option does not select which route/routing case is selected to send a range, but rather it eliminates routing cases that are not setup with the default option. However, it is important to note that the "default routing case" option does not have to be selected on a particular route. The route determiner user could decide that none of the routing cases that have that particular route as their primary option should necessarily be the "default" routing case. It is only when the option is selected, and at least one other routing case exists that has that route as its primary route, that this option is actually used. Otherwise no elimination is performed when the route determiner reaches this section of the route determination procedure. For example, if 'RTE 2' is a tandem route that has two routing cases that list 'RTE 2' as their primary route (RC1, RC2), then the default routing case option will eliminate any and all routing cases that are not setup as default. Since only one routing case can be default for the route, all other routing cases assigned to that route can be deleted automatically. So if neither RC 2, nor RC 1 were setup as default, then both would be options to send the NPA/NXX range. This is the case with RTE 1, where no routing case is setup with either "default routing case" or "auto routing case", thus allowing both route/routing cases to move on to the next option 'COST' 284 as possible options to send the NPA/NXX range. However, in our example, RC 2 has been setup as the default routing case for 'RTE 2', therefore RC 1/RTE 2 will be eliminated as a potential route/routing case option to send the NPA/NXX range.

Regarding the cost analysis 284, if only one route/routing case option remains, such as routes where the NPA/NXX range can be sent remains, then that would be the route/routing case where the NPA/NXX range would be sent. However, if more than one option exists, then the decision of where to send the NPA/NXX range goes to the cost analysis section 284 of the route determiner. The route determiner maintains five cost lists within its database in order to determine the cost of calls for each NPA/NXX range being called by the subscribers of the company using the route determiner software application platform.

The cost lists maintained by the route determiner may include a specific rate for an individual common language location identifier (CLLI), a price list assigned to a rule set, a long distance calling rate list, a local price list by an operating company number (OCN), a default cost per hierarchical level, and rates by the CLLI. The first rate checked is the rate by the CLLI. The route determiner allows users to assign a price to an individual CLLI. A CLLI is an entity such as a tandem or an end office. Any ranges that are homed by the end office, or parented by the tandem (as specified by the LERG) would be subject to the price assigned by the user. If a value is assigned to a particular CLLI, The route determiner would stop looking for any other values. Therefore, "Rates by CLLI" overrides all other values that may be assigned to an NPA/NXX range that is either homed or parented by the CLLI that was assigned a rate value.

The route determiner further provides the capability to its users to assign price lists to individual rule sets. Once The route determiner determines that the CLLI's associated with this NPA/NXX range do not have any price assigned to them, it then checks the rule set assigned to the NPA/NXX range to determine if there is a price list associated with the NPA/NXX range. If so, the route determiner must check that list to determine if this particular NPA/NXX range is on the list. If the range is on the list, and has a an associated price then the route determiner uses that price, and no longer continues to check for other prices or price lists. However, if there is no price list, or if a price list exists, but the NPA/NXX range being examined is not on the price list, then the route determiner must continue to look for a price for the NPA/NXX range.

The route determiner then checks to see whether or not this range is assigned to a rule set that is at the long distance level. If so, it must check the long distance price list to determine if the NPA/NXX range that is being examined is on this list, and if so, what is its associated price. If a price is associated with the NPA/NXX range, then the route determiner has its price, and will now stop looking through the price lists. However, if there is no price found for the range, or if the range is not assigned to a rule set that is assigned to the long distance level, then the route determiner must continue to search for a price for the NPA/NXX range being examined.

FIG. 2G illustrates a decision matrix 290 used by the route determiner to determine the exact cost of sending a NPA/NXX range to an end office, tandem, or neutral tandem route. For each of these route types, a check is performed to determine the cost of sending the NPA/NXX down that particular route. In FIG. 2G, the first determination is whether or not the route in question is a neutral tandem (NT) route. A NT route is a hierarchical level that is assigned to rule sets having routes that travel to companies that provide discounted rates to carriers to transmit calls to other carriers. If the route is assigned to the "Neutral Tandem" level, then only conditions seven through ten of FIG. 2G apply, all other conditions are eliminated. Otherwise, conditions one through six (not NT level) would apply.

The next question to be answered is whether or not the rate for the OCN and state of the route CLLI (as defined in the LERG) can be found on the local carrier rate list. In the case of a route that is not designated as "Neutral Tandem", the OCN and state of the CLLI of the route in question can be used to look-up the rate from the local carrier rate list. In the event that the rate is not found using the OCN and state of the route CLLI (either the rate was not found on the local carrier rate list, or there was no local carrier rate list), then a check is performed to determine if the OCN of the NPA/NXX that is being analyzed is equal to the OCN of the route being analyzed. If the answer is "Yes", then the rate to be used is the default terminate rate. If the answer is "No", then the next question to be answered is whether or not a rate can be found in the local carrier rate list using the OCN and state of the NPA/NXX CLLI. If the answer to that question is "Yes", then the NPA/NXX terminate rate (from the local carrier rate list) and the default transit rate (set by the user in the "Default Rates" section) will both be used. If the answer to that question was "No", then the only rate that applies is the default transit rate.

In the case where the route being checked is designated as "Neutral Tandem", then the CLLI of the route cannot be used. Using rates to a NT or a similar type of company would not make sense because companies like NT provide discounts to terminate ranges of 3rd party companies, not their own ranges. Therefore, The route determiner must use the CLLI of a U-, B-, C-, D-, or T-type, tandem of the NPA/NXX range that is actually being analyzed. Then the route determiner will determine the OCN and state of that CLLI in order to look up on the same local carrier per minute rate list using the NT column, to obtain the specific rate to terminate calls to the NT for that NPA/NXX. As has been described, and as can be seen in FIG. 2G, it may be necessary to add multiple rates together to get the proper rate for a particular NPA/NXX range, depending on which conditions were satisfied.

The "Current Route/RC Analysis" of FIG. 2F is used only when there is more than one route/routing case with the same cost for a particular NPA/NXX range, even after performing a rates by OCN and default hierarchical rates analysis. In this example, the route determiner checks to determine if the NPA/NXX range being analyzed is currently residing on one of the route/routing cases stored in memory that is currently in contention for taking the range. If one of the route/routing cases that is currently in contention to receive the NPA/NXX range includes that range already, then it is selected as the route/routing case to send the range. If none of the route/routing cases is currently one of those in contention to take the range, then the process continues to the "End Office (EO)—special homing arrangement (SHA)" analysis 288 of FIG. 2G.

Figure 3:
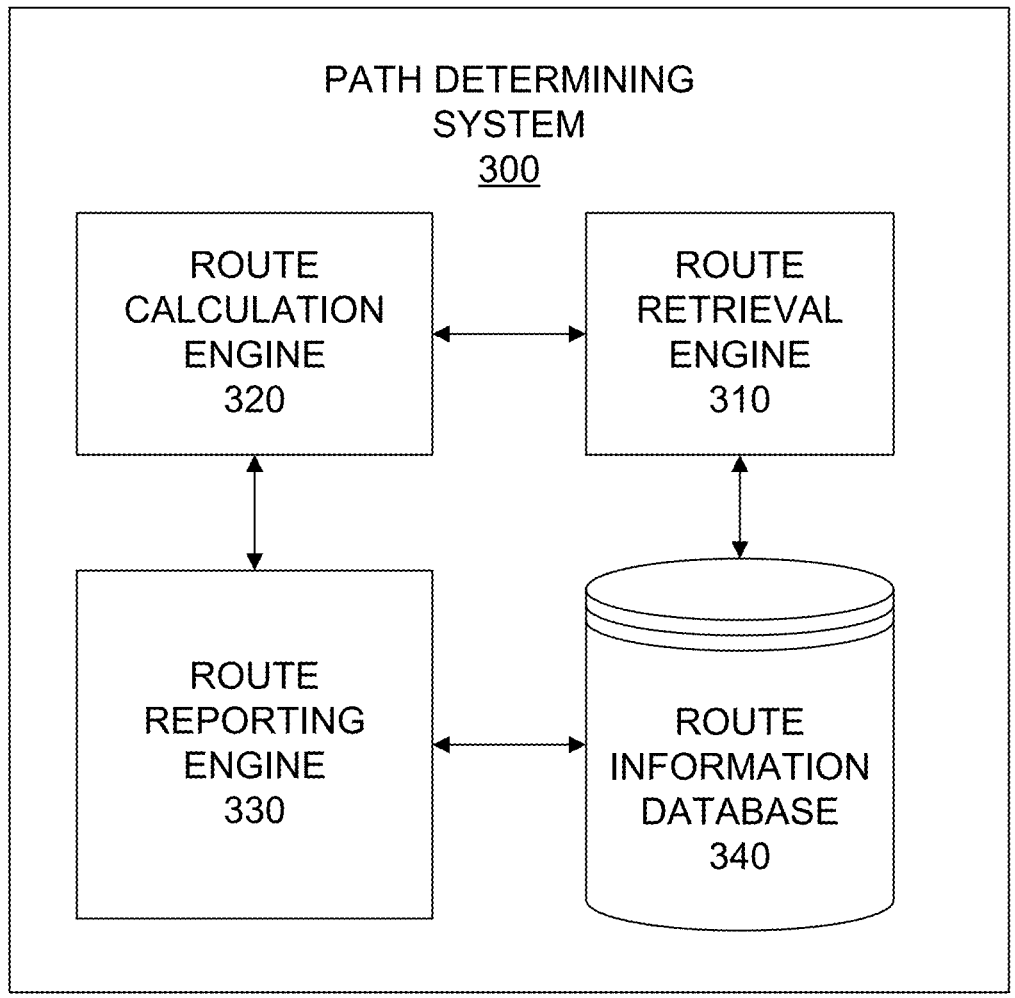
FIG. 3 illustrates a system diagram of a routing entity configured to provide one or more routing operations corresponding to the example embodiments of the present invention.

FIG. 3 illustrates a system diagram of a path determining system configured to provide one or more routing operations corresponding to the example embodiments of the present invention. Referring to FIG. 3, a route information database 340 may retrieve, store and provide route information used to determine a route for a NPA/NXX range or other call type that needs to be routed. In order to determine an optimal routing path to route the call through the network, the route engine 310 may retrieve at least one routing table from various network entities operating on the network. The route calculation engine 320 may parse the routing table to extract route information that may be used to route the call through the network. The parsed information may be organized, labeled and stored in the route information database 340. The route reporting engine 330 may determine a number of routes that could be used to route the call through the network by applying a cost metric to the various determined routes and determine an order of the routes used to route the call. The route reporting engine 330 may also create a route guide or list of routes used to route the call based on the available routes and the determined order of the routes.

If an NPA/NXX range reaches the EO-SHA portion of the route determination procedure then it means that there is currently more than one route/routing case that is in contention to receive the NPA/NXX, the route/routing case combinations that remain have the same cost, and the NPA/NXX range being analyzed is not currently going down any of those routes that are in contention to receive the NPA/NXX range. The route determiner must now determine both the end office CLLI and the special homing arrangement (SHA) of the NPA/NXX range being analyzed. The route determiner then checks to see where the majority of the ranges are routed that have that same end office CLLI and SHA. If the route determiner determines that one of the route/routing cases that are in contention to receive the NPA/NXX range has at least one more NPA/NXX range than any of the other route/routing cases that are in contention to receive the NPA/NXX range, than the route determiner selects that route/routing case as the one that will receive the NPA/NXX range.

If none of the routes have any ranges that belong to the same EO CLLI and SHA, then none of the route/routing cases are selected to receive the NPA/NXX range and the process moves to the next step in the analysis. Likewise, if there are multiple route/routing cases in contention to receive the NPA/NXX range and they have the same number of ranges with the same end office CLLI and SHA, then the route determiner moves on to the next method of analysis.

A final operation that the route determiner may use is the "pick oldest route/routing case" selection. This procedure involves the random act of selecting any of route/routing cases that are in contention to receive the NPA/NXX. The route determiner performs this selection by selecting the route that arrived in the database first. This operation is the final procedure of selecting a route/routing case for the NPA/NXX range to traverse. If the route determiner proceeds to this step in the procedure, then the decision as to which route/routing case the NPA/NXX range will take will ultimately be decided here.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
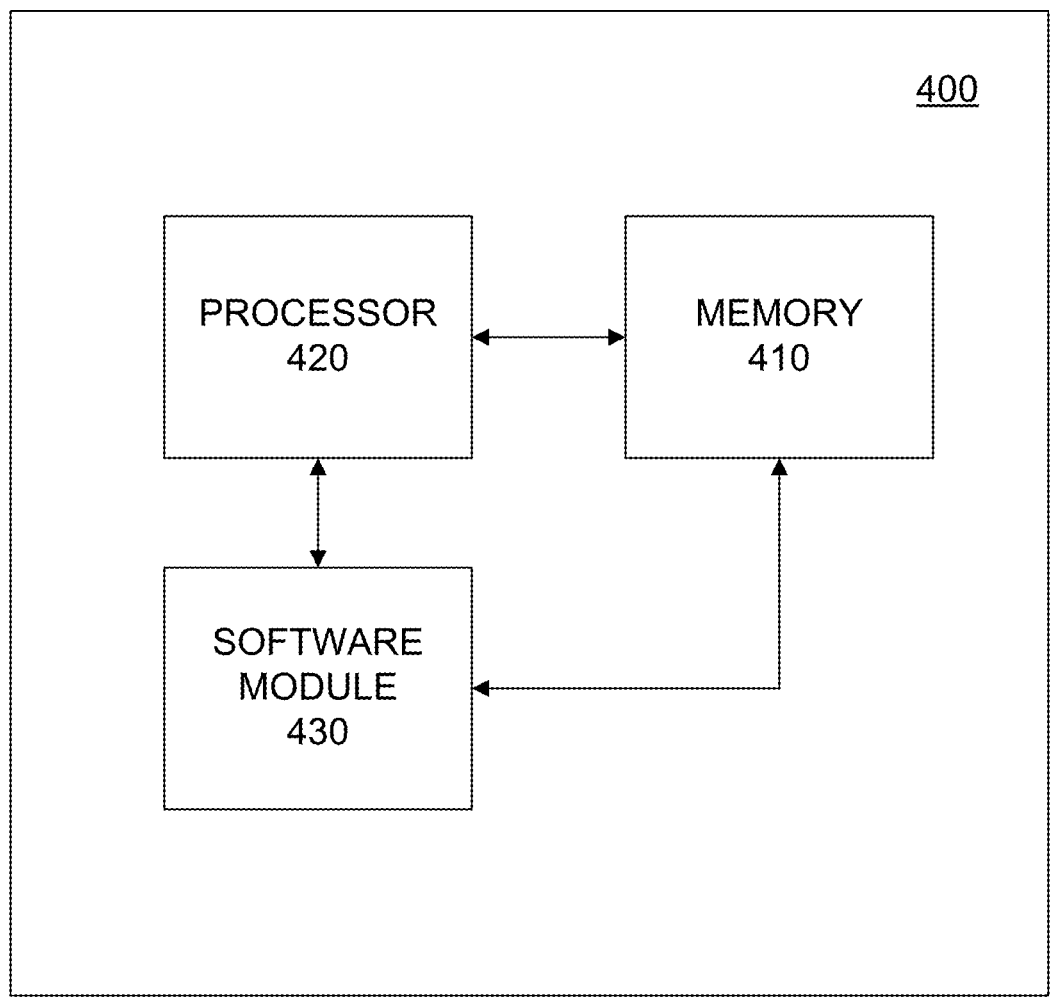
FIG. 4 illustrates a network entity that may include memory, software code and other computer processing hardware, and which may be configured to perform operations according to example embodiments of the present invention.
Figure 5:
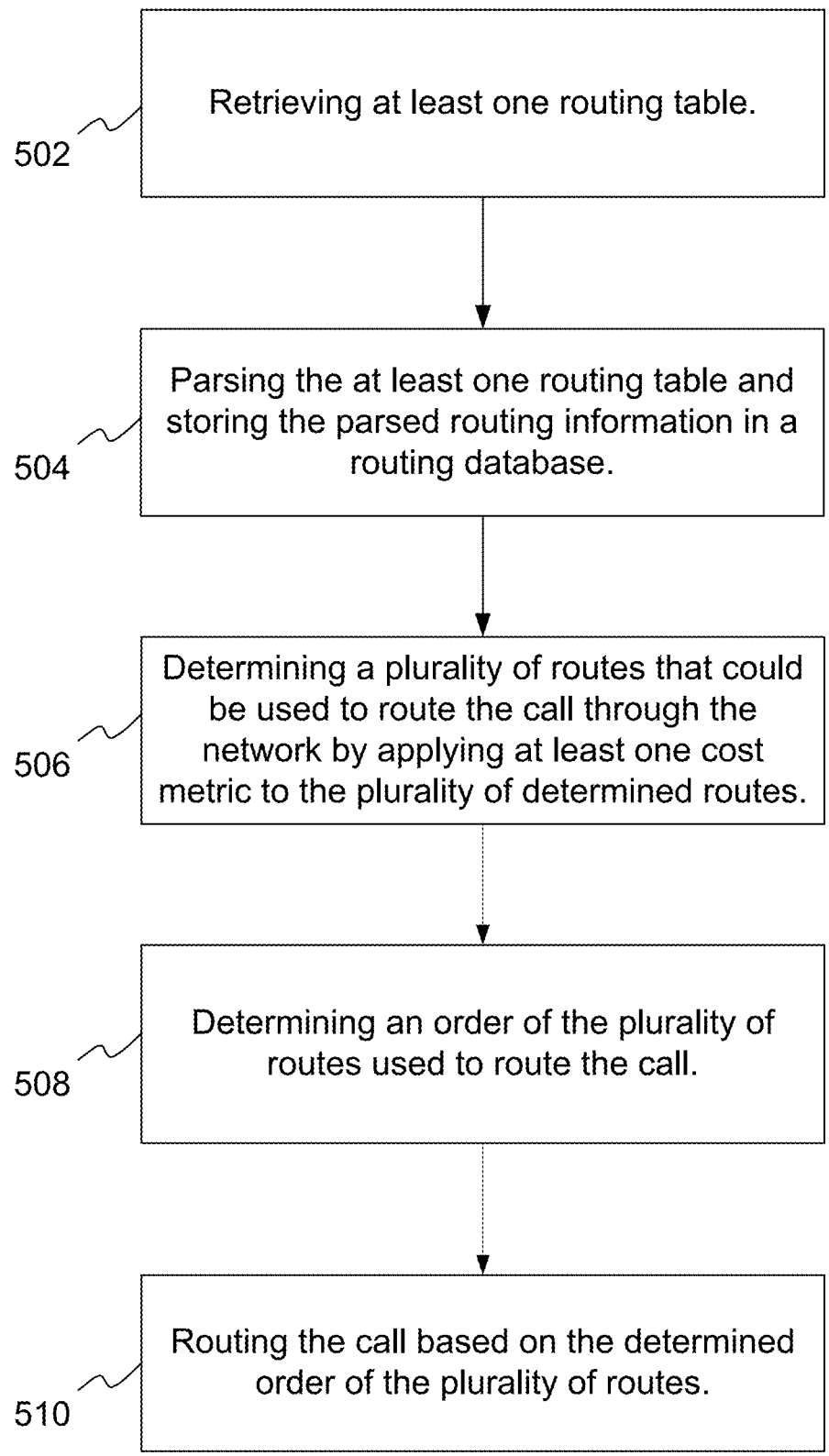
FIG. 5 illustrates a flow diagram corresponding to an example embodiment of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

One example embodiment may include a method of determining an optimal routing path. The method may include retrieving at least one routing table at operation 502, parsing the at least one routing table and storing the parsed routing information in a routing database at operation 504, and determining a plurality of routes that could be used to route the call through the network by applying at least one cost metric to the plurality of determined routes, at operation 506. The method may also include determining an order of the plurality of routes used to route the call at operation 508 and creating a route used to route the call based on the plurality of routes and the determined order of the plurality of routes at operation 510.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   parsing via a processor at least one routing table stored in a routing database;
   determining an order of a plurality of routes to route a call;
   creating at least one rule set used to determine the order of the plurality of routes, the rule set comprising at least one number plan area code/numbering (NPA/NXX) range;
   determining a price value of an optimal routing path based on an identified specific numerical value of the NPA/NXX range and a carrier price list; and
   creating a route to route the call by applying the at least one rule set, the determined order of the plurality of routes, and the price value of the optimal routing path.

2. The method of claim 1, wherein the rule set applies at least one predetermined range of number plan area code (NPA) and numbering range (NXX) numbers.

3. The method of claim 1, wherein the rule set is a hierarchy that includes at least a long-distance routing tier, tandem routing tier and an end office routing tier.

4. The method of claim 1, wherein the rule set further comprises a lowest price carrier option.

5. The method of claim 1, wherein the rule set is based on a predetermined number plan area code/numbering (NPA/NXX) range.

6. The method of claim 1, wherein the at least one routing table is received from a plurality of network elements of a network through which route the call.

7. The method of claim 1, wherein routing the call comprises routing the call to a tandem, end office, long distance carrier, an inter-machine trunk (IMT), a session initiation protocol (SIP) route, and a mobile switching center.

8. An apparatus, comprising:
   a memory; and
   a processor communicably coupled to the memory, the processor configured to:
      parse at least one routing table stored in a routing database;
      determine an order of a plurality of routes to route a call;
      create at least one rule set used to determine the order of the plurality of routes, the rule set comprising at least one number plan area code/numbering (NPA/NXX) range;
      determine a price value of an optimal routing path based on an identified specific numerical value of the NPA/NXX range and carrier price list; and
      create a route to route the call by applying the at least one rule set, the determined order of the plurality of routes, and the price value of the optimal routing path.

9. The apparatus of claim 8, wherein the rule set applies at least one predetermined range of number plan area code (NPA) and numbering range numbers (NXX).

10. The apparatus of claim 8, wherein the rule set is a hierarchy that includes at least a long-distance routing tier, tandem routing tier and an end office routing tier.

11. The apparatus of claim 8, wherein the rule set is a lowest price carrier option.

12. The apparatus of claim 8, wherein the rule set is based on a predetermined number plan area code/numbering (NPA/NXX) range.

13. The apparatus of claim 8, wherein the at least one routing table is received from a plurality of network elements of a network through which route the call.

14. The apparatus of claim 8, wherein routing the call comprises routing the call to a tandem, end office, long distance carrier, an inter-machine trunk (IMT), a session initiation protocol (SIP) route, and a mobile switching center.

15. A non-transitory computer readable storage medium configured to store instructions that when executed cause a processor to perform:
 parsing at least one routing table stored in a routing database;
 determining an order of a plurality of routes to route a call;
 creating at least one rule set used to determine the order of the plurality of routes, the rule set comprising at least one number plan area code/numbering (NPA/NXX) range;
 determining a price value of an optimal routing path based on an identified specific numerical value of the NPA/NXX range and a carrier price list; and
 creating a route to route the call by applying the at least one rule set, the determined order of the plurality of routes, and the price value of the optimal routing path.

16. The non-transitory computer readable storage medium of claim 15, wherein the rule set applies at least one predetermined range of a number plan area code (NPA) and numbering range (NXX) numbers.

17. The non-transitory computer readable storage medium of claim 15, wherein the rule set comprises a hierarchy that includes at least a long-distance routing tier, tandem routing tier and an end office routing tier.

18. The non-transitory computer readable storage medium of claim 15, wherein the rule set is a lowest price carrier option.

19. The non-transitory computer readable storage medium of claim 15, wherein the rule set is based on a predetermined number plan area code/numbering (NPA/NXX) range.

20. The non-transitory computer readable storage medium of claim 15, wherein the at least one routing table is received from a plurality of network elements of a network through which route the call.

* * * * *